United States Patent
Sun et al.

(10) Patent No.: US 9,310,555 B2
(45) Date of Patent: Apr. 12, 2016

(54) MODE SIZE CONVERTERS AND METHODS OF FABRICATING THE SAME

(71) Applicant: Tyco Electronics Corporation, Berwyn, PA (US)

(72) Inventors: Jibin Sun, Mountain View, CA (US); Haipeng Zhang, Santa Clara, CA (US); Sandeep Razdan, Millbrae, CA (US); Nicola Pugliano, Redwood City, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/279,515

(22) Filed: May 16, 2014

(65) Prior Publication Data

US 2015/0331189 A1   Nov. 19, 2015

(51) Int. Cl.
*G02B 6/26* (2006.01)
*G02B 6/14* (2006.01)
*G02B 6/122* (2006.01)

(52) U.S. Cl.
CPC .............. *G02B 6/14* (2013.01); *G02B 6/1228* (2013.01)

(58) Field of Classification Search
CPC .... G02B 6/14; G02B 6/1228; G02B 6/12007; G02B 6/136; B82Y 20/00; C30C 15/00
USPC ............................................... 385/28; 216/24
See application file for complete search history.

(56) References Cited

U.S. PATENT DOCUMENTS

| | | | |
|---|---|---|---|
| 6,767,756 B2* | 7/2004 | Lee ..................... | G02B 6/136 385/129 |
| 7,317,853 B2* | 1/2008 | Laurent-Lund et al. ........ 385/43 | |
| 8,045,832 B2 | 10/2011 | Pan et al. | |
| 8,538,213 B2* | 9/2013 | Uchida et al. .................. 385/43 | |
| 2002/0191916 A1 | 12/2002 | Frish et al. | |
| 2003/0053756 A1* | 3/2003 | Lam et al. ...................... 385/49 | |
| 2004/0081415 A1 | 4/2004 | Demaray et al. | |
| 2004/0114869 A1* | 6/2004 | Fike et al. ....................... 385/43 | |
| 2005/0175286 A1 | 8/2005 | Patel et al. | |

(Continued)

FOREIGN PATENT DOCUMENTS

| EP | 1378772 A2 | 1/2004 |
|---|---|---|
| WO | 0229905 A1 | 4/2002 |

(Continued)

OTHER PUBLICATIONS

Martin Afromowitz, "Photolithography with a Twist, A workshop on gray scale and 3-D methods," (Jan. 31, 2014).

(Continued)

*Primary Examiner* — Ellen Kim

(57) ABSTRACT

One aspect of the invention provides a method of fabricating a mode size converter. The method includes: exposing a photoresist-coated substrate to varying doses of light exposure to produce a profile in the photoresist of a beam mode size converter; and etching the photoresist-coated substrate to remove an equal thickness of the photoresist and substrate. The beam mode sized converter includes: a first surface having a first surface height and a first surface width; a second surface opposite the first surface, the second surface having a second surface height different than the first surface height and a second surface width different than the first surface width; and one or more boundary surfaces connecting the first surface and second surfaces.

13 Claims, 5 Drawing Sheets

(56) References Cited

U.S. PATENT DOCUMENTS

| | | |
|---|---|---|
| 2005/0175287 A1 | 8/2005 | Pan et al. |
| 2006/0285797 A1* | 12/2006 | Little .............................. 385/43 |
| 2008/0197107 A1 | 8/2008 | Gao et al. |
| 2012/0321244 A1* | 12/2012 | Suzuki et al. ................... 385/14 |

FOREIGN PATENT DOCUMENTS

| | | |
|---|---|---|
| WO | 02097489 A2 | 12/2002 |
| WO | 2011136741 A1 | 11/2011 |

OTHER PUBLICATIONS

Fang et al., "Mode-size converter with high coupling efficiency and broad bandwidth," Optics Express, 19(22):21588-21594 (2011).

Markov et al., "Fiber-to-chip coupler designed using an optical transformation," Optics Express, 20(13):14705-14713 (2012).

Mayeh et al., "Laser Beam Shaping and Mode Conversion in Optical Fibers," Photonic Sensors, 1(2):187-198 (2011).

Microwaves101.com, Photolithography 101, http://www.microwaves101.com/encyclopedias/509-photolithography-101 (2011).

Rammohan et al., "One-step maskless grayscale lithography for the fabrication of 3-dimensional structures in SU-8," Sensors and Actuators B, 153:125-134 (2011).

Shoji et al., "Low loss mode size converter from 0.3μm square Si wire waveguides to singlemode fibres," Electronic Letters, 38(25):1669-1670 (2002).

Waits et al., "Microfabrication of 3D silicon MEMS structures using gray-scale lithography and deep reactive ion etching," Science Direct, Sensors and Actuators A, 119:245-253 (2005).

International Search Report and Written Opinion mailed Aug. 3, 2015 in PCT application PCT/US2015/031224 (counterpart of U.S. Appl. No. 14/279,515).

* cited by examiner

MODE SIZE CONVERTERS AND METHODS OF FABRICATING THE SAME

BACKGROUND

Although significant progress has been made in the fields of silicon-compatible optical interconnect and information processing technology, low-loss coupling between optical fiber and high-index contrast single-mode silicon nano-wire waveguides remains a challenge.

SUMMARY OF THE INVENTION

One aspect of the invention provides a method of fabricating a mode size converter. The method includes: exposing a photoresist-coated substrate to varying doses of light exposure to produce a profile in the photoresist of a beam mode size converter; and etching the photoresist-coated substrate to remove an equal thickness of the photoresist and substrate. The beam mode sized converter includes: a first surface having a first surface height and a first surface width; a second surface opposite the first surface, the second surface having a second surface height different than the first surface height and a second surface width different than the first surface width; and one or more boundary surfaces connecting the first surface and second surfaces.

This aspects of the invention can have a variety of embodiments. The first surface can have a rectangular profile. The first surface can have a square profile. The second surface can have a rectangular profile. The second surface can have a square profile. The second surface height can be smaller than the first surface height; and the second surface width can be smaller than the first surface width.

The mode size converter can be fabricated from silicon. The silicon can have a refractive index of 3.5; the first surface height can be about 13 µm; the first surface width can be about 13 µm; the second surface height can be about 0.35 µm; the second surface width can be about 0.145 µm; and the first surface and the second surface can be separated by a length of about 1 mm.

The mode size converter can be fabricated from a polymer. The polymer can be a refractive index of 1.5; the first surface height can be about 9 µm; the first surface width can be about 9 µm; the second surface height can be about 3 µm; the second surface width can be about 3 µm; and the first surface and the second surface can be separated by a length of about 1 mm. The polymer can be SU-8. The polymer can be a polyimide.

Another aspect of the invention provides a mode size converter produced according to the methods described herein.

Another aspect of the invention provides a mode size converter including: a first surface having a first surface height and a first surface width; a second surface opposite the first surface, the second surface having a second surface height different than the first surface height and a second surface width different than the first surface width; and one or more boundary surfaces connecting the first surface and second surfaces. The one or more boundary surfaces can be formed by gray scale photolithography.

This aspect of the invention can have a variety of embodiments. The first surface can have a rectangular profile. The first surface can have a square profile. The second surface can have a rectangular profile. The second surface can have a square profile. The second surface height can be smaller than the first surface height; and the second surface width can be smaller than the first surface width.

The mode size converter can be fabricated from silicon. The silicon can have a refractive index of 3.5; the first surface height can be about 13 µm; the first surface width can be about 13 µm; the second surface height can be about 0.35 µm; the second surface width can be about 0.145 µm; and the first surface and the second surface can be separated by a length of about 1 mm.

The mode size converter can be fabricated from a polymer. The polymer can be a refractive index of 1.5; the first surface height can be about 9 µm; the first surface width can be about 9 µm; the second surface height can be about 3 µm; the second surface width can be about 3 µm; and the first surface and the second surface can be separated by a length of about 1 mm. The polymer can be SU-8. The polymer can be a polyimide.

DESCRIPTION OF THE FIGURES

For a fuller understanding of the nature and desired objects of the present invention, reference is made to the following detailed description taken in conjunction with the figure wherein.

DETAILED DESCRIPTION

The special three-dimensional design of infrared wavelength beam mode size converters requires a complicated fabrication process that results in high cost, low repeatability, and scalability issues that inhibit utilization of this technology to interconnect optics elements, such as optical fiber, waveguide material, and laser source.

Aspect of this invention utilize 3-D photolithography techniques to fabricate three-dimensional features in a single exposure process. Aspects of the invention present a one-step process to create both polymer waveguide and silicon-based 3-D mode size converter microstructures.

Traditional Photolithography

Figure 1:
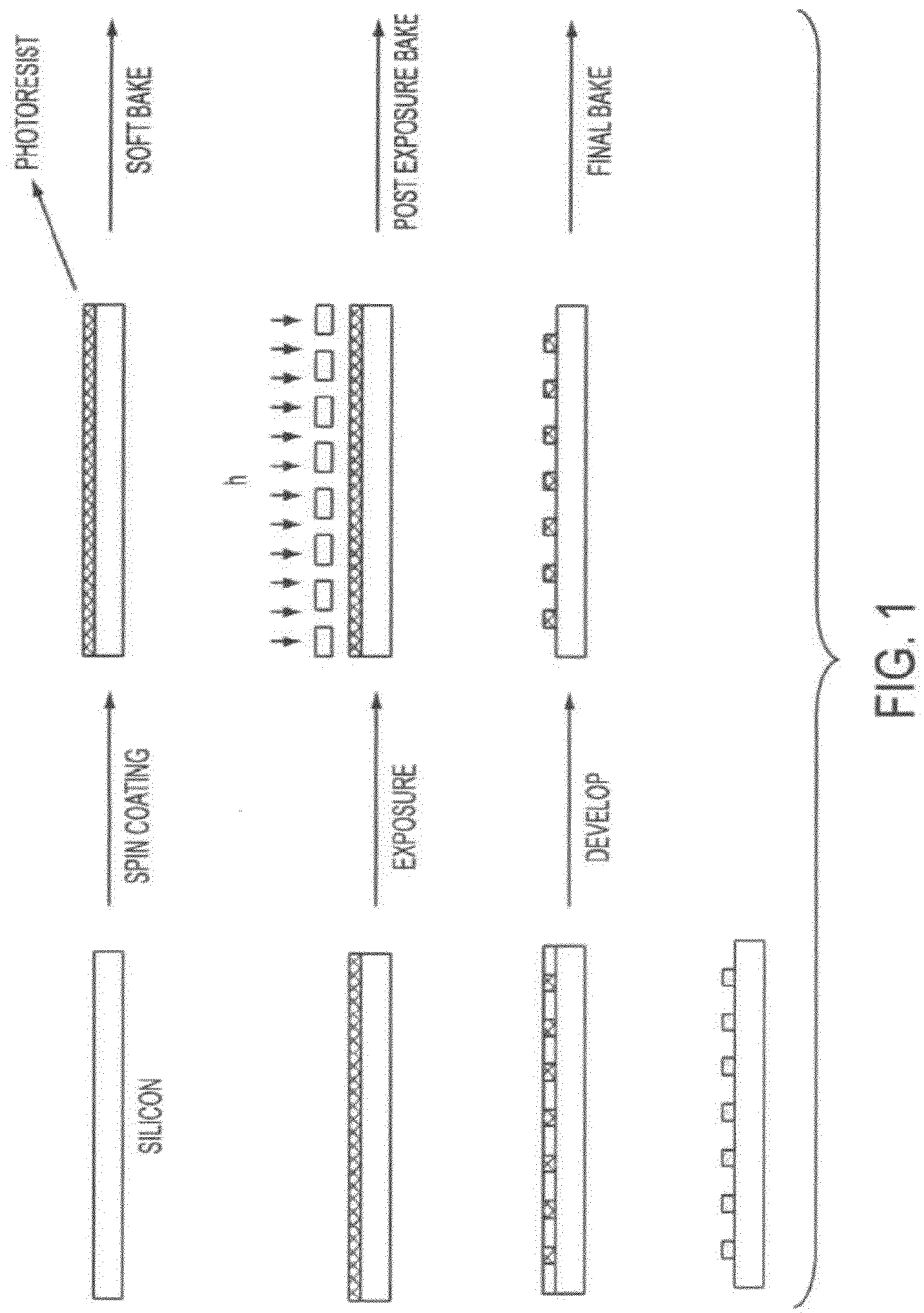
FIG. 1 depicts the process of traditional photolithography.

FIG. 1 depicts the process of traditional photolithography, which requires several steps in order to produce high resolution planar features. Modern photolithography is highly integrated through a track system and can handle thousands of wafers every month. However, common photolithography masks does not produce a light exposure gradient. Instead, conventional photolithography masks only define "exposed areas" and "un-exposed areas.". This on/off dichotomy confines this technology to be able to only fabricate 2-D planar microstructures as depicted in FIG. 1.

Mode Size Converters

A mode size converter is designed to interconnect small mode optical elements, such as a silicon nanowire waveguide (the cross section of which is usually hundreds of nanometers) with single mode fiber (the core of which is about 9 micrometers in diameter). The dramatic mode mismatch between two optical elements requires the "interconnect" to be a 3-D structure with smooth surface to reduce optical loss. As discussed above, the traditional photolithography can not be directly applied here to create such 3-D structures.

Gray Scale Photolithography

Figure 2:
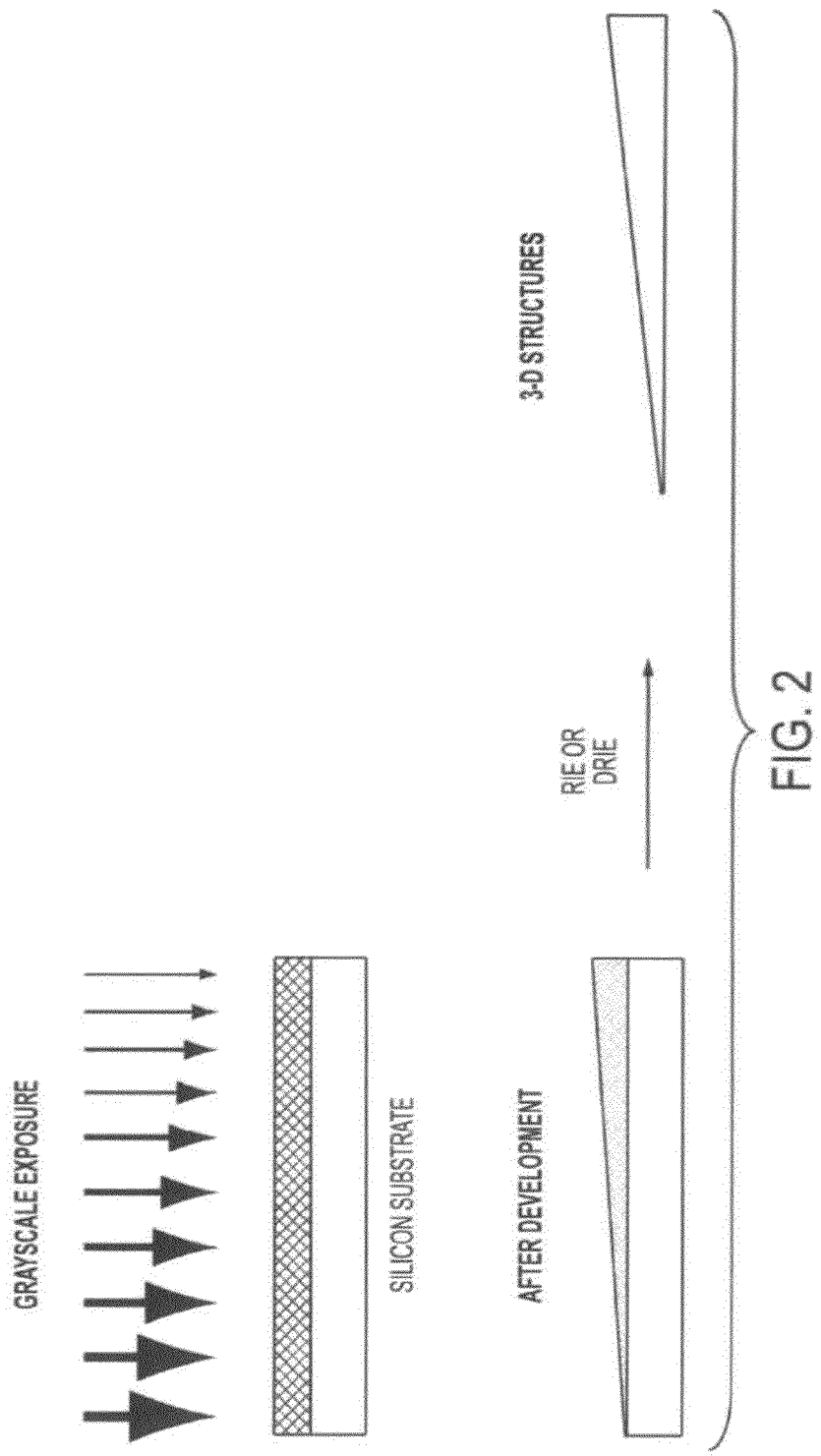
FIG. 2 depict the process of gray scale photolithography.

Gray scale photolithography uses light transmission gradients to control light exposure latitude so that each point within the exposed area can have light dose ranges from 100% exposure to 0% exposure. This will change the photoresist dissolution behavior in the developer to enable smoothly developed 3-D microstructures such as depicted in FIG. 2.

Figure 4:
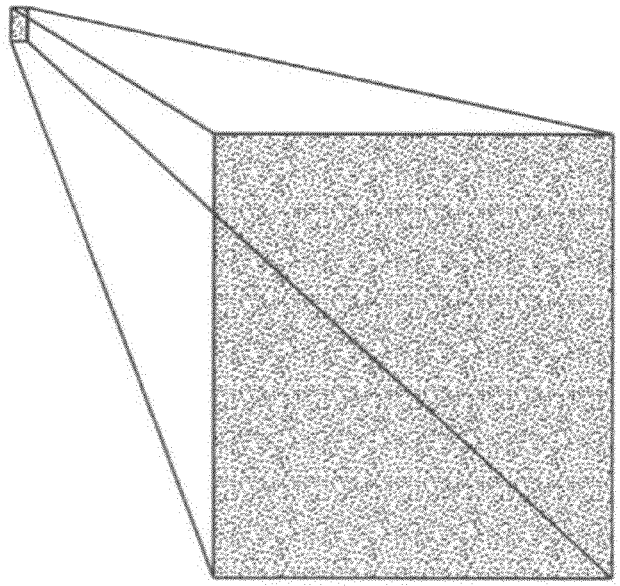
FIG. 4 depicts a silicon-based mode size converter according to an embodiment of the invention.
Figure 3:
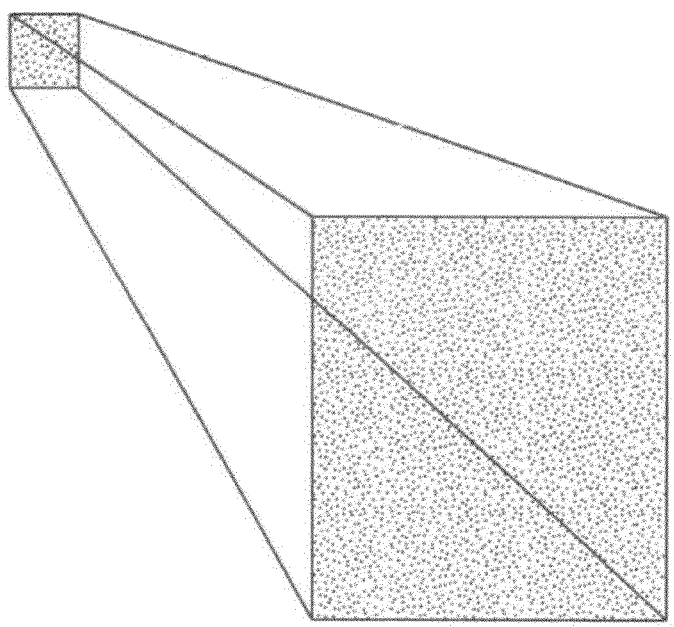
FIG. 3 depicts a polymer-based mode size converter according to an embodiment of the invention.

Preliminary modeling results suggest the following two designs are promising candidates as effective mode size converter to couple light from a 145 nm×350 nm inorganic waveguide to a 9 µm diameter core single mode fiber. FIG. 3 depicts an RI (refractive index)=1.5 polymer-based mode size converter. Suitable polymers include SU-8 and polyimide materials. FIG. 4 depicts a silicon-based mode size converter. Gray scale photolithography can be used to fabricate both structures by a single exposure and development process.

Figure 5:
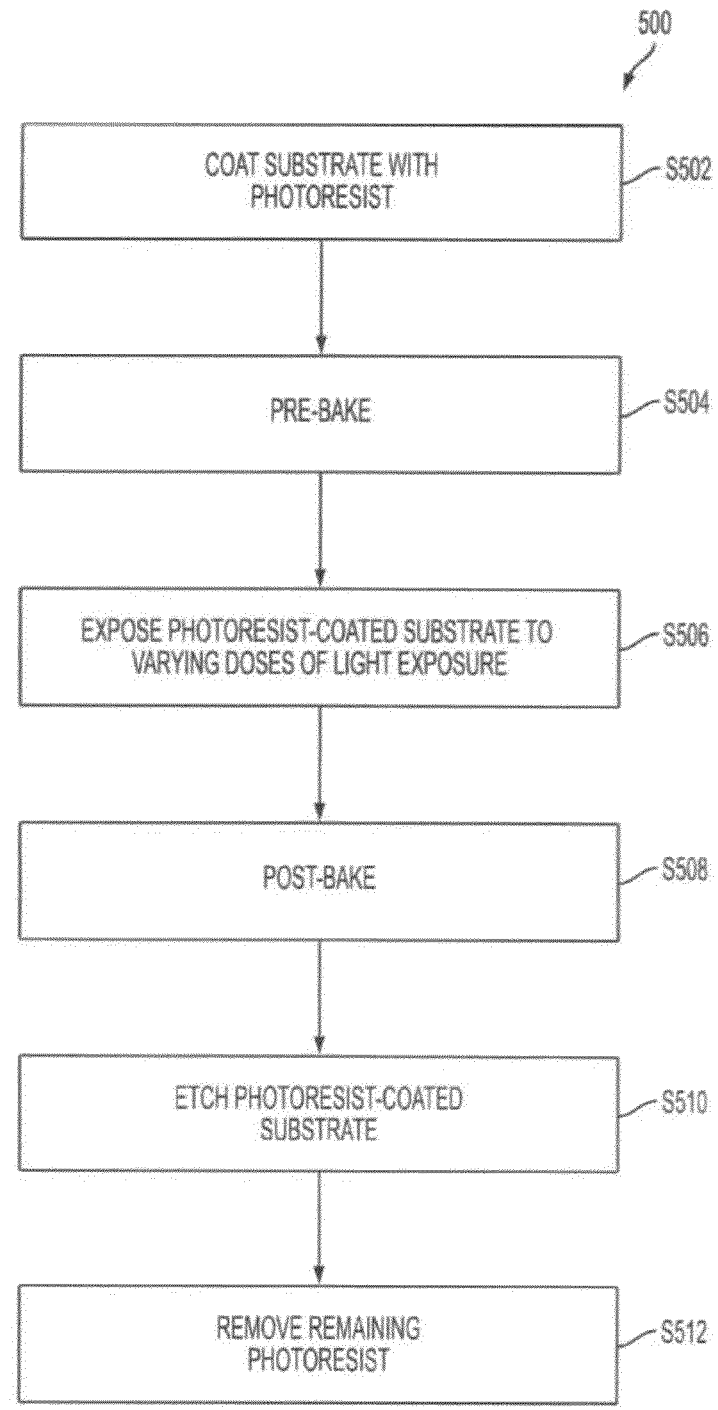
FIG. 5 depicts a method of fabricating a mode size converter according to an embodiment of the invention.

Referring now to FIG. 5, a method 500 of fabricating a mode size converter is provided.

In step S502, a substrate is coated with photoresist. Suitable substrates includes polymers such as fully-cured polymer thin films, silicon, and the like. Suitable photoresists include SU-8, poly(methyl methacrylate) (PMMA), poly(m-ethyl glutarimide) (PMGI), phenol formaldehyde resin, and the like and are available from a variety of manufacturers including AZ Electronic Materials USA Corp. of Branchburg, N.J. The photoresist can be spun, sprayed, or otherwise deposited onto the substrate using various known techniques.

In step S504, the photoresist-coated substrate is pre-baked to evaporate the photoresist solvent. Relatively low temperatures (e.g., between about 90° C. to about 100° C.) and durations (e.g., between about 30 seconds to about 60 seconds) can be sufficient depending on the amount of photoresist applied to the substrate.

In step S506, the photoresist-coated substrate is exposed to varying doses of light exposure. A variety of techniques can be utilized to produce the varying doses of light. In one embodiment, projection lithography is performed using a wafer stepper in order to modulate the intensity of light applied to each pixel of the photoresist. In one embodiment, High Energy Beam Sensitive (HEBS) glass available from Canyon Materials, Inc. of San Diego, Calif. is used to modulate light exposure. In one embodiment, microfluidic photomasks are used as described in Chihchen Chen et al., "Grayscale photolithography using microfluidic photomasks," 100 (4) *PNAS* 1499-1504 (2003).

In step S508, the photoresist-coated substrate can be post-baked (also called hard-baking) according to the manufacturer's specification to solidify the remaining photoresist. For example, the photoresist-coated substrate can be baked at between 120° C. to about 180° C. for between about 20 minutes to about 30 minutes.

In step S510, the photoresist-coated substrate can be etched. In some embodiments, the etching removes an equal thickness of the photoresist and the substrate. A variety of etching techniques are available including "wet" etches that utilize liquid and "dry" etches that utilize plasma. The etching techniques can be isotropic or anisotropic. In one embodiment, deep reactive-ion etching (DRIE) is used.

In step S512, any remaining photoresist can be removed either through use of a liquid "resist stripper" or by an "ashing" process.

Figure 6:
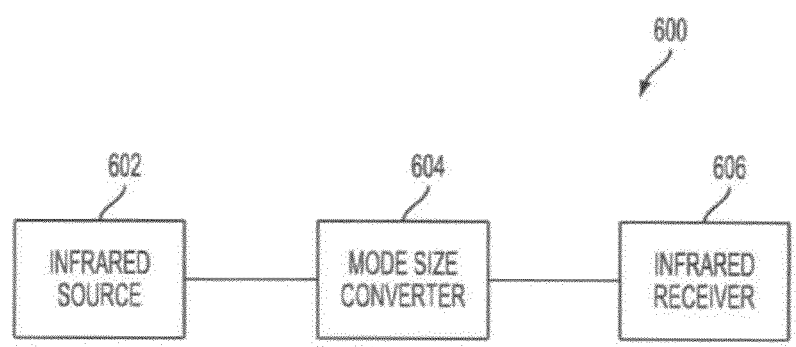
FIG. 6 depicts a system incorporating a mode size converter according to an embodiment of the invention.

Applications for Mode Size Converters Fabricated Using Gray Scale Photolithography Mode size converters described and produced according to the methods described herein can be utilized in a variety of applications. Such converters are particularly useful in transforming infrared beams. One exemplary system 600 is depicted in FIG. 6. The system 600 can include an infrared source 602 and a mode size converter 604. System 600 can optionally include an infrared receiver 606 positioned to receive an infrared beam emerging from the mode size converter 604. Applications for the mode size converters described herein include silicon photonics, waveguides, single mode fiber interconnects, and the like. In one embodiment, the infrared source 602 is an inorganic waveguide structure (e.g., a waveguide structure having a cross section of about 145 nm×350 nm) and the infrared receiver 606 is a single mode optical fiber (e.g., having a diameter of about 9 µm).

EQUIVALENTS

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules and the like) shown as distinct for purposes of illustration can be incorporated within other functional elements, separated in different hardware, or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

The invention claimed is:

1. A method of fabricating a mode size converter, the method comprising:
    exposing a photoresist-coated substrate to varying doses of light exposure to produce a profile in the photoresist of a beam mode size converter including:
        a first surface having a first surface height and a first surface width;
        a second surface opposite the first surface, the second surface having a second surface height different than the first surface height and a second surface width different than the first surface width; and
        one or more boundary surfaces connecting the first surface and second surfaces; and
    etching the photoresist-coated substrate to remove an equal thickness of the photoresist and substrate.

2. The method of claim 1, wherein the first surface has a rectangular profile.

3. The method of claim 1, wherein the first surface has a square profile.

4. The method of claim 1, wherein the second surface has a rectangular profile.

5. The method of claim 1, wherein the second surface has a square profile.

6. The method of claim 1, wherein:
    the second surface height is smaller than the first surface height; and
    the second surface width is smaller than the first surface width.

7. The method of claim 1, wherein the mode size converter fabricated from silicon.

8. The method of claim 7, wherein:
    the silicon has a refractive index of 3.5;
    the first surface height is about 13 µm;
    the first surface width is about 13 µm;
    the second surface height is about 0.35 µm;
    the second surface width is about 0.145 µm; and the first surface and the second surface are separated by a length of about 1 mm.

9. The method of claim 1, wherein the mode size converter is fabricated from a polymer.

10. The method of claim 9, wherein:
the polymer has a refractive index of 1.5;
the first surface height is about 9 μm;
the first surface width is about 9 μm;
the second surface height is about 3 μm;
the second surface width is about 3 μm; and
the first surface and the second surface are separated by a length of about 1 mm.

11. The method of claim 9, wherein the polymer is SU-8.

12. The method of claim 9, wherein the polymer is a polyimide.

13. A mode size converter produced according to the method of claim 1.

* * * * *